(12) United States Patent
Todd et al.

(10) Patent No.: US 8,905,136 B2
(45) Date of Patent: Dec. 9, 2014

(54) FAR FIELD DIVERSION TECHNIQUE FOR TREATING SUBTERRANEAN FORMATION

(75) Inventors: Bradley L. Todd, Duncan, OK (US); Stanley J. Heath, Duncan, OK (US); Jeff T. Fleming, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 549 days.

(21) Appl. No.: 12/813,959

(22) Filed: Jun. 11, 2010

(65) Prior Publication Data

US 2011/0303415 A1 Dec. 15, 2011

(51) Int. Cl.

| E21B 43/26 | (2006.01) |
| C09K 8/504 | (2006.01) |
| C09K 8/82 | (2006.01) |
| C09K 8/506 | (2006.01) |
| C09K 8/502 | (2006.01) |
| C09K 8/84 | (2006.01) |

(52) U.S. Cl.
CPC ............... *C09K 8/82* (2013.01); *C09K 8/5045* (2013.01); *C09K 8/506* (2013.01); *C09K 8/502* (2013.01); *C09K 8/845* (2013.01)
USPC ........................................ 166/305.1; 166/281

(58) Field of Classification Search
None
See application file for complete search history.

(56) References Cited

U.S. PATENT DOCUMENTS

| 4,157,116 A * | 6/1979 | Coulter ...................... 166/280.1 |
| 5,161,615 A * | 11/1992 | Hutchins et al. .............. 166/295 |
| 5,981,447 A * | 11/1999 | Chang et al. .................. 507/271 |
| 6,889,766 B2 | 5/2005 | Creel et al. |
| 6,896,058 B2 | 5/2005 | Munoz, Jr. et al. |
| 2002/0193256 A1 * | 12/2002 | Harris, Jr. ..................... 507/200 |
| 2004/0074643 A1 * | 4/2004 | Munoz et al. .................. 166/279 |
| 2004/0168798 A1 | 9/2004 | Creel et al. |
| 2004/0168802 A1 | 9/2004 | Creel et al. |
| 2004/0220058 A1 | 11/2004 | Eoff et al. |
| 2005/0059557 A1 * | 3/2005 | Todd et al. .................... 507/110 |
| 2006/0065397 A1 * | 3/2006 | Nguyen et al. ............. 166/280.1 |
| 2006/0086501 A1 | 4/2006 | Creel et al. |
| 2006/0169455 A1 | 8/2006 | Everett et al. |
| 2006/0213662 A1 | 9/2006 | Creel et al. |
| 2006/0234871 A1 | 10/2006 | Dalrymple et al. |
| 2007/0277979 A1 | 12/2007 | Todd et al. |
| 2009/0223667 A1 | 9/2009 | Rispler |
| 2009/0242202 A1 | 10/2009 | Rispler et al. |

FOREIGN PATENT DOCUMENTS

| CA | 2801374 A1 | 12/2011 |
| EP | 1 413 710 | 4/2004 |
| WO | 2004/076808 A1 | 9/2004 |
| WO | 2004/076812 A1 | 9/2004 |
| WO | 2005/119003 A1 | 12/2005 |
| WO | 2006/061561 A1 | 6/2006 |
| WO | 2006/082363 A1 | 8/2006 |
| WO | 2007/083109 A1 | 7/2007 |
| WO | WO 2009/027685 | 3/2009 |
| WO | WO 2009/118512 | 10/2009 |

OTHER PUBLICATIONS

International Search Report for International Application No. PCT/GB2011/000885, 4 pages.
Written Opinion of the International Searching Authority for International Application No. PCT/GB2011/000885, 9 pages.
Official Action for Canadian Patent Application 2,801,653 dated Jan. 8, 2014.

* cited by examiner

*Primary Examiner* — Angela M DiTrani
(74) *Attorney, Agent, or Firm* — McDermott Will & Emery LLP; Craig W. Roddy

(57) ABSTRACT

An aqueous-swellable and degradable diverting system and the use of the system in treating a subterranean formation penetrated by a wellbore. The diverting system includes a carrier fluid and a partially dehydrated or anhydrous borate source material that does not swell or does not swell substantially when placed in contact with the carrier fluid. The carrier fluid is capable of carrying and placing the borate source material into a stimulation network substantially distanced from a wellbore. Exposure of the diverting composition to a sufficient amount of aqueous fluid swells the borate source material, bridges a desired portion of the stimulation network, and then dissolves at least a portion of the diverting composition. The diverting techniques allow for treatment in a subterranean formation to be diverted to a previously untreated portion of the formation, in particular a portion of the formation that is significantly distanced from the wellbore.

15 Claims, No Drawings

US 8,905,136 B2

FAR FIELD DIVERSION TECHNIQUE FOR TREATING SUBTERRANEAN FORMATION

FIELD OF THE INVENTION

This invention relates to an aqueous-swellable and degradable diverter system and the use of the system in treating a subterranean formation.

BACKGROUND

After a wellbore is drilled and completed in a subterranean formation, stimulation operations are usually performed to enhance hydrocarbon production (e.g., oil, gas, etc.) into the wellbore, e.g., by increasing the permeability of the hydrocarbon through the subterranean formation.

A widely used stimulation technique is hydraulic fracturing, in which a fracturing fluid is injected through a wellbore into the surrounding formation at a sufficient pressure to fracture the formation adjacent to the wellbore, creating a fracture network for fluid to flow through the formation back to the wellbore.

Generally, fracturing treatment in a rock formation can create single fractures which extend from opposing sides of the wellbore, i.e., a bi-wing fracture. However, it may not be feasible to create such fractures in many carboniferous formations, such as shales, clays, and/or coal beds. These carboniferous formations typically have finely laminated structures that are easily broken down into pieces. Therefore, creating an effective fracture network in these formations can be an issue.

Efforts have been made to increase cracking of the formations and overall connectivity of the fracture network. For example, diverting agents, such as particulate materials, have been used to block larger fractures in a formation in order to increase permeability of the formation uniformly. However, these diverting systems are typically used near the wellbore and may not be effective to divert treatment fluids to portions of the formation that are significantly distanced from the wellbore. The volume of the formation being treated, therefore, is rather limited.

Another common stimulation technique is acidizing, in which an aqueous acid treatment fluid is introduced into the formation to dissolve acid-soluble materials, e.g., to dissolve materials present in carbonate formations, leaving a desirable amount of voids (e.g., etched fracture, or wormholes) within the formation. This allows hydrocarbon fluids the ability to more easily flow from the formation into the wellbore. Also, acid treatments facilitate the flow of injected treatment fluids from the wellbore into the formation. Conventional diverting systems for the acidizing treatment of carbonate formation may also encounter similar issues to those encountered when implementing hydraulic treatments in shale formations. For example, the volume of the formation being treated is rather limited, often failing to reach locations that are distanced from the wellbore.

Therefore, there is a continuing need in the art for diverting systems that can effectively treat a high volume of subterranean formation, including portions that are distanced from the wellbore.

SUMMARY OF THE INVENTION

This invention relates to an aqueous-swellable and degradable diverter system and the use of the system in treating a subterranean formation penetrated by a wellbore. The diverting system is similar to the swellable and degradable sand plug system for treating horizontal wellbores, as described in U.S. patent application Ser. No. 12/813,843, entitled "Swellable/degradable 'sand' plug system for horizontal wells," now published as U.S. Patent Application Publication No. 2011/0303411, filed on Jun. 11, 2010.

One aspect of the invention relates to a method for treating a subterranean formation penetrated by a wellbore. The method comprises the steps of (i) introducing a diverting composition through one or more fractures in a subterranean formation penetrated by a wellbore, wherein the diverting composition comprises a carrier fluid and an aqueous-swellable particle that does not swell substantially when placed in contact with the carrier fluid; and (ii) exposing the diverting composition to a sufficient amount of aqueous fluid. In some embodiments, the aqueous-swellable particle is a partially dehydrated or anhydrous borate source material. The aqueous fluid swells the particle to a point where it bridges the fractures, and then, after the fractures have been bridged, dissolves at least a portion of the diverting composition. The carrier fluid of the diverting composition may be a non-aqueous fluid, or when the average size of the aqueous-swellable particle is sufficient large (14 mesh size or larger, e.g., from about 8 mesh to about 14 mesh), the carrier fluid may also be an aqueous fluid.

Another aspect of the invention relates to a method for treating a subterranean formation penetrated by a wellbore. The method comprises the steps of (i) introducing a diverting composition through one or more wormholes in a subterranean formation penetrated by a wellbore, wherein the diverting composition comprises a carrier fluid and an aqueous-swellable particle that does not swell substantially when placed in contact with the carrier fluid; and (ii) exposing the diverting composition to a sufficient amount of aqueous fluid. In some embodiments, the aqueous-swellable particle is a partially dehydrated or anhydrous borate source material. The aqueous fluid swells the particle to a point where it bridges the wormholes, and then, after the wormholes have been bridged, dissolves at least a portion of the diverting composition.

Another aspect of the invention relates to a diverting technique for treating a subterranean zone that is substantially distanced from a wellbore. The method comprises the steps of (i) placing a diverting composition through a stimulation network (i.e., a network that may include one or more fractures, a fracture network, one or more wormholes or a wormhole network) in a subterranean zone substantially distanced from a wellbore, wherein the diverting composition comprises a carrier fluid and an aqueous-swellable particle that does not swell substantially when placed in contact with the carrier fluid; and (ii) exposing the diverting composition to a sufficient amount of aqueous fluid. In some embodiments, the aqueous-swellable particle is a partially dehydrated or anhydrous borate source material. The aqueous fluid (a) swells the particle to a point where it bridges at least a portion of the stimulation network in the subterranean zone substantially distanced from the wellbore, and then (b), after a portion of the stimulation network has been bridged, dissolves at least a portion of the diverting composition.

Yet another aspect of the invention provides a diverting composition for treating a subterranean zone substantially distanced from a wellbore. The diverting composition comprises a carrier fluid and an aqueous-swellable particle. In some embodiments, the aqueous-swellable particle is a partially dehydrated or anhydrous borate source material. The carrier fluid is capable of carrying and placing the aqueous-swellable particle into a stimulation network substantially distanced from a wellbore. The aqueous-swellable particle does not swell substantially when placed in contact with the carrier fluid and is dissolvable through sufficient contact with an aqueous fluid.

DETAILED DESCRIPTION

This invention relates to an aqueous-swellable and degradable diverting system and the use of the system in treating subterranean formation penetrated by a wellbore. Among other things, the methods allow for treatment in a subterranean formation, such as a fracturing treatment to a subterranean formation or a acidizing treatment to a carbonate formation, to be diverted to a previously untreated portion of the formation, in particular a portion of the formation that is significantly distanced from the wellbore.

One aspect of the invention relates to a method for treating a subterranean formation penetrated by a wellbore having one or more fractures or a fracture network formed therein. The method involves introducing a diverting composition comprising a carrier fluid and an aqueous-swellable particle into one or more fractures (or a fracture network) in a subterranean formation penetrated by a wellbore. The diverting composition is then exposed to a sufficient amount of aqueous fluid so that the aqueous fluid swells the particle to a point where it bridges the fractures. After the fracture network has been bridged, the aqueous fluid dissolves at least a portion of the diverting composition. Fluids, such as treatment fluids and/or produced formation fluids can then be freely flowed through the fracture network in the subterranean formation.

Another aspect of the invention relates to a method for treating a subterranean formation penetrated by a wellbore having one or more wormholes or a wormhole network formed therein. The method involves introducing a diverting composition comprising a carrier fluid and an aqueous-swellable particle into one or more wormholes (or a wormhole network) in a subterranean formation penetrated by a wellbore. The diverting composition is then exposed to a sufficient amount of aqueous fluid so that the aqueous fluid swells the particle to a point where it bridges the wormholes. After the wormhole network has been bridged, the aqueous fluid dissolves at least a portion of the diverting composition. Fluids, such as treatment fluids and/or produced formation fluids can then be freely flowed through the wormhole network in the subterranean formation.

Another aspect of the invention relates to a diverting technique for treating a subterranean zone that is substantially distanced from a wellbore. The method comprises the steps of placing a diverting composition comprising a carrier fluid and an aqueous-swellable particle into a stimulation network in a subterranean zone substantially distanced from a wellbore. Then the diverting composition is exposed to a sufficient amount of aqueous fluid. The aqueous fluid swells the particle to a point where it bridges at least a portion of the stimulation network in the subterranean zone substantially distanced from the wellbore. After the desirable portion of the stimulation network has been bridged, the aqueous fluid dissolves at least a portion of the diverting composition.

"Stimulation network," as used herein, may include fractures, fracture network, etched fractures, and etching on the face of a formation. Stimulation network can also include the voids formed within the formation during wellbore stimulation operation (e.g., acidizing), such as etched fractures, wormholes or wormhole network, i.e., voids created during acid fracturing of a formation, such as a carbonate formation. "Fracture network," herein refers to a network of multiple fractures that intersect with each other. The terms "fractures" and "fracture network" can be used interchangeably. Likewise, the terms "wormholes" and "wormhole network" can be used interchangeably. Wormholes may be created during stimulation or acidizing treatment of carbonate formations. A wormhole may extend from a wellbore into the formation. A wormhole network may or may not extend to the fracture network. Stimulation networks can make an important contribution to both the storage (porosity) and the fluid flow rates (permeability) of formations.

The subterranean formation may be any formation penetrated by a wellbore for production of hydrocarbons (e.g., oil, gas, etc.). For example, the formation may be any type of geothermal formation. The subterranean formation may be composed of one or more of any type of rocks, such as sedimentary rocks like sandstone, limestone and shale; igneous rocks like granite and andesite; or metamorphic rocks like gneiss, slate, marble, schist, and quartzite. In one embodiment, the subterranean formation is treated with a fracturing treatment, and the formation may be a shale formation, a clay formation, a sandstone formation, a limestone formation, a carbonate formation, a granite formation, a marble formation, a coal bed, or combinations thereof. The term "shale" refers to a sedimentary rock formed from the consolidation of fine clay and silt materials into laminated, thin bedding planes. In another embodiment, the subterranean formation is treated with an acidizing treatment, and the formation may be a carbonate formation, where wormholes may be created in the formation as a result of the acidizing stimulation. Other types of formations known to one skilled in the art can also be treated by the methods.

The diverting composition comprises a carrier fluid and an aqueous-swellable particle. An aqueous-swellable particle is any particle or composition that swells substantially in the presence of water or aqueous fluid. In some embodiments, the aqueous-swellable particle is a partially dehydrated or anhydrous borate source material. The borate source material that is at least partially dehydrated or anhydrous expands or swells substantially when hydrated. Exemplary borate source material suitable for use includes, but are not limited to, anhydrous boric oxide, anhydrous sodium borate, sodium perborate monohydrate, and combinations thereof. Other aqueous-swellable particulate materials can also be used herein, for instance, particulate sodium or potassium salt of polyacrylic acid or alginic acid, polyacrylate-cellulose graft copolymer, collagen, chitin, chitosan, dextran, carboxymethyldextran, starch, modified starch, hydroxyethyl starch, hydrolyzed polyacrylonitrile, starch-methacrylonitrile polymer, polyacrylamide, hydrolyzed polyacrylamide (SEPARAN®AP-30, Dow Chemical Co.), carboxymethylcellulose, and derivatives thereof. These aforementioned aqueous-swellable particles can be used alone or in combination.

One example of the borate source material used herein is a substantially dehydrated or anhydrous boric oxide. Boric oxide, $B_2O_3$, is typically found in the vitreous state as a colorless glassy solid, and is typically obtained as a white powder. Boric oxide is chemically hygroscopic, i.e., it absorbs moisture or water from the air, and can hydrate to boric acid. Other names for anhydrous boric oxide include diboron trioxide, boric anhydride, anhydrous boric acid.

Substantially dehydrated or anhydrous sodium perborate may be used as the aqueous-swellable particle. Sodium perborate, $NaBO_3$, crystallizes as the sodium perborate monohydrate, $NaBO_3 \cdot H_2O$, and sodium perborate trihydrate, $NaBO_3 \cdot 3H_2O$, Sodium perborate undergoes hydrolysis in contact with water, producing hydrogen peroxide and borate.

Substantially dehydrated or anhydrous sodium borate may also be used. Anhydrous sodium borate, $Na_2B_4O_7$, is also known variously as dehydrated borax, boron sodium oxide, anhydrous borax, DEHYBOR® (Borax Inc., Valencia, Calif.), sodium pyroborate, and sodium tetraborate. Anhydrous sodium borate is chemically hygroscopic, slightly soluble in cold water, and insoluble in acids.

The aqueous-swellable particle may have a wide range of sizes. For example, size of the particle may range from about 400 mesh to about 2 mesh (U.S. Sieve Series). In some embodiments, size may range from about 150 mesh to about 8 mesh, or from about 40 mesh to about 8 mesh, from about 40 mesh to about 20 mesh, from about 40 mesh to about 30 mesh, or from about 14 mesh to about 8 mesh.

The choice of sizes of aqueous-swellable particles may depend on many factors such as the carrier fluid used, the concentration of the diverting composition, the anticipated swelling rate or anticipated time for bridging the stimulation network. For example, when the fractures or wormholes in the stimulation network are large enough to use a diverting composition containing aqueous-swellable particles with a large average particle size, an aqueous fluid can be used to carry the diverting composition, as the swelling of the aqueous-swellable particle may be delayed for a long enough period of time that the diverting composition can be delivered to the desired stimulation network before substantive swelling of the particles occurs. Additionally, higher concentration of the particles in the diverting composition may slow down the full contact of the particles with aqueous solution, and hence may delay the swelling of the aqueous-swellable particles.

In one embodiment, the average size of the aqueous-swellable particles is about 14 mesh or larger, and the swelling of the particles can be delayed for at least about 10 minutes. In one embodiment, the average size of the aqueous-swellable particles ranges from about 14 mesh to about 8 mesh, and the swelling of the particles can be delayed for at least about 10 minutes, 20 minutes, or 30 minutes or more. For instance, boric oxide at 8 mesh size typically swells less than 30% after 30 minutes in water, less than 25% after 20 minutes in water and less than 20% after 10 minutes in water. Accordingly, it is possible to use an aqueous fluid as the carrier fluid when the aqueous-swellable particle will not swell substantially and immediately when placed in contact with the carrier fluid.

On the other hand, when the average sizes of the aqueous-swellable particles are small enough, the aqueous-swellable particles may swell instantaneously or nearly instantaneously (e.g., within seconds, or within 1 minute to 10 minutes), once exposed to aqueous fluid to seal the stimulation network. When the average size of the aqueous-swellable particles is about 30 mesh or smaller, substantial swelling of the particles (e.g. 25%-40%) may occur within 1 minute thereby sealing the stimulation network. For example, when the aqueous-swellable particles is about 40 mesh size or smaller, substantial swelling of the particles (e.g. 25%-40%) may occur instantaneously (e.g., within seconds) upon contact with aqueous fluid; and when the average size of the aqueous-swellable particles ranges from about 40 mesh to about 30 mesh, substantial swelling of the particles (e.g. 25%-40%) may occur within 1 minute after exposing the diverting composition to the aqueous liquid. When the average size of the aqueous-swellable particles is about 30 mesh or larger, substantial swelling of the particles may occur within 3 to 30 minutes thereby sealing the stimulation network. For instance, when the average size of aqueous-swellable particles ranges from about 30 mesh to about 10 mesh, substantial swelling of the particles (e.g. 25%-40%) may occur within 3 to 10 minutes after exposing the diverting composition to the aqueous liquid.

The diverting composition may also comprise other particulate materials commonly used in diverting systems. These particulate materials may be blended with the aqueous-swellable particle to form a diverting composition in the carrier fluid. Suitable particular materials include, but not limited to sand, ceramic beads, bauxite, glass microspheres, synthetic organic beads, sintered materials and combinations thereof. Suitable particular materials may also include polymer materials, TEFLON® materials, nut shell pieces, seed shell pieces, cured resinous particulates comprising nut shell pieces, cured resinous particulates comprising seed shell pieces, fruit pit pieces, cured resinous particulates comprising fruit pit pieces, wood, composite particulates and combinations thereof.

In some embodiments, the particulate materials to be blended with the aqueous-swellable particles are degradable materials including, but not limited to, degradable polymers, dehydrated compounds, and mixtures thereof. Suitable examples of degradable polymers that may be used include, but are not limited to, homopolymers, and random, block, graft, and star- or hyper-branched polymers. Specific examples of suitable polymers include polysaccharides such as dextran or cellulose, chitin, chitosan, proteins, aliphatic polyesters, poly(lactide), poly(glycolide), poly(ε-caprolactone), poly(hydroxybutyrate), poly(anhydrides), aliphatic polycarbonates, poly(ortho esters), poly(amino acids), poly(ethylene oxide), and polyphosphazenes. Polyanhydrides are another type of suitable degradable polymer. Examples of suitable polyanhydrides include poly(adipic anhydride), poly(suberic anhydride), poly(sebacic anhydride), and poly(dodecanedioic anhydride). Other suitable examples include, but are not limited to, poly(maleic anhydride) and poly(benzoic anhydride). The aforementioned materials may be found, for instance, in U.S. Patent Application Publication Nos. 2009/0223667 and 2009/0242202, which are incorporated herein by reference in their entirety.

In choosing the appropriate particulate materials, one should consider the compatibility of the particulate materials with the aqueous-swellable particles. The particulate materials should not adversely affect the expandability of the aqueous-swellable particles and solubility of the aqueous-swellable particles after hydration. Moreover, in choosing the appropriate degradable material, one should consider the degradation products that will result. In general, the degradation products should not adversely affect subterranean operations or components. The choice of degradable material also can depend, at least in part, on the conditions of the subterranean formation, e.g., the temperature of the subterranean formation. For instance, lactides have been found to be suitable for subterranean formation at a lower temperature, including those within the range of 60° F. to 150° F.; polylactides have been found to be suitable for temperatures above this range; and poly(lactic acid) and dehydrated salts may be suitable for a higher temperature. Also, in some embodiments a desirable result is achieved if the degradable material degrades slowly over time as opposed to instantaneously. Accordingly, in some embodiments, it may be desirable to utilize a degradable material that does not substantially degrade until after the diverting composition containing the degradable material has been placed in a stimulation network in a desired location of the subterranean formation substantially distanced from a wellbore.

The aqueous-swellable particle is suspended in the carrier fluid and placed into a stimulation network in the subterranean formation by introducing the fluid carrying the aqueous-swellable particles into the subterranean formation. The diverting composition may be pumped into the stimulation network. The pumping rate and pressure as well as pumping techniques may be similar as those described in U.S. patent application Ser. No. 12/354,551, entitled "Methods of setting particulate plugs in horizontal well bores using low-rate slurries," now issued as U.S. Pat. No. 8,074,715, filed on Jan. 15, 2009, incorporated herein by reference in its entirety.

In some embodiments, the carrier fluid is water-miscible non-aqueous fluid. While the diverting composition travels through the stimulation network, the non-aqueous fluid starts to mingle and intermix with aqueous fluids. Aqueous fluid may be contained in the formation or being introduced before, during or after the pumping of the diverting composition. As the non-aqueous fluid carries and places the aqueous-swellable particle into the stimulation network to the desired location that is substantially distanced from the wellbore (far-field), the aqueous fluid will sufficiently mingle with the non-aqueous fluid to replace the non-aqueous fluid in the diverting composition and contact the aqueous-swellable particles. The aqueous fluid then swells the particles to bridge and seals the fractures or wormholes, thus diverting fluids to other portions of the formation. These steps may be repeated until the desired numbers of treatments have been conducted.

The concentration of the aqueous-swellable particle may range from about 10 pounds per thousand gallons of carrier fluid (10 lbs/Mgal) to about 4000 lbs/Mgal, for instance, from about 20 lbs/Mgal to about 1000 lbs/Mgal, or from about 100 lbs/Mgal to about 500 lbs/Mgal. Low-concentration diverting compositions may not permit sufficient packing of the aqueous-swellable particles within the stimulation network to seal the fractures or wormholes; however, diverting composition with too high a concentration and excessive densities may result in material deposits within the undesirable locations. When other particulate materials are used in the diverting composition, the concentration of aqueous-swellable particles may be reduced accordingly and the aqueous-swellable particles may still present in sufficient amounts to seal the fractures or wormholes.

The volume percentage of the aqueous-swellable particle in the diverting composition may range from about 0.0456% v/v to about 15.4% v/v, for instance, from about 0.1% v/v to about 4.4% v/v, or from about 0.5% v/v to about 2.2% v/v.

A variety of non-aqueous carrier fluids can be utilized with the aqueous-swellable particle. In principal, any water-miscible non-aqueous fluid and combinations thereof can be used herein. Exemplary non-aqueous fluids suitable for use include, but are not limited to, polar protic solvents such as glycols like ethylene glycol or propylene glycol, and alcohols like isopropanol; polar aprotic solvents such as carbonates like propylene carbonate or ethylene carbonate, N,N-dimethylformamide, acetone, tetrahydrofuran, dichloromethane, 1,4-dioxane, dimethylsulfoxide, tetramethylenesulfone, acetonitrile, hexamethylphosphoramide, and 1,3-methyl-3,4,5,6-tetrahydro-2(1H)-pyrimidinone; and combinations thereof.

The carrier fluid may also comprise a viscosity-increased substance, such as a gelling agent for gelling the fluid and increasing its viscosity. The increased viscosity of the carrier fluid may control and/or reduce fluid loss into the subterranean formation, enhance the suspension properties of the carrier fluid and allow the carrier fluid to transport significant quantities of suspended particles. In certain subterranean operations, increased viscosity of the carrier fluid may also provide additional benefits, such as creating or enhancing fracture width in fracturing treatment. The gelling agents may be biopolymers comprising natural, modified and derivatized polysaccharides, and derivatives thereof. Suitable gelling agents include, but are not limited to xanthan, diutan, guar and derivatives of guar gum, galactomannan gum, cellulose and derivatives thereof, and combinations thereof. The carrier fluid may also include one or more of a variety of well-known additives such as breakers, stabilizers, fluid-loss-control additives, clay stabilizers, bactericides, and the like.

Use of non-aqueous fluid as a carrier fluid allows for carrying and placing the aqueous-swellable particle into the stimulation network (fracture network or wormhole network) in the subterranean formation that is substantially distanced from the wellbore. The aqueous-swellable particle does not swell when placed in contact with the non-aqueous carrier fluid, without contacting an aqueous fluid. Thus using a non-aqueous fluid as a carrier fluid can avoid or at least delay the pre-expansion of the aqueous-swellable particles before transported and placed in the desired location deep into the subterranean formation. For example, expansion of the aqueous-swellable particle, after exposure to an aqueous fluid, may be delayed for at least about 5 minutes, about 30 minutes or about 2 hours, upon using a non-aqueous fluid as a carrier fluid. The time of delayed expansion may depend on the properties of the aqueous-swellable particle and the non-aqueous fluid. For example, boric acid reacts with water and swells instantaneously (e.g., within a few seconds) when being contacted with water without the use of a non-aqueous fluid. Whereas using a non-aqueous fluid, such as glycols, as a carrier fluid may delay the swelling of boric acid for about 30 minutes.

Additionally, the diverting composition may also be designed in a format to provide a delayed expansion of the aqueous-swellable particles upon contact with aqueous fluid. For example, the aqueous-swellable particle may be encapsulated or enclosed within an outer coating that is capable of degrading at a desired time. Exemplary suitable encapsulation or coating methods include microencapsulation techniques, such as fluidized bed processes; agglomerating or pelletizing the aqueous-swellable particle prior to coating the particle with the degradable material; and physically mixing the aqueous-swellable particle with the degradable material and forming a single, solid particle. One skilled in the art will be able to choose appropriate encapsulation or coating methods, considering the desirable delayed expansion time and the physical-chemical properties of the aqueous-swellable particle.

The diverting composition thus can be used in all portions of the subterranean formation penetrated by a wellbore, including portions that are substantially distanced from the wellbore. The terms "substantially distanced from the wellbore," or "far field," may refer to any portion of the subterranean formation that is not near wellbore, outside of a perforation tunnel or outside of a formation face in openhole. These portions of the subterranean formation are usually beyond the range where conventional diverting agents can reach. For example, far field may refer to the subterranean zone that is from about 10 feet to about 3000 feet from a wellbore or perforation tunnel, or from about 100 to about 1000 feet from a wellbore or perforation tunnel.

The non-aqueous carrier fluid is water-miscible to aid the contact of the aqueous-swellable particle with an aqueous fluid. After the non-aqueous carrier fluid places the aqueous-swellable particle into the desired stimulation network (i.e., desired fractures or wormholes) in the subterranean formation, the diverting composition is exposed to sufficient aqueous fluid so that water replaces the non-aqueous fluid of the diverting composition, reacts with the aqueous-swellable particles, and expands the diverting composition.

As used herein, a material is considered to be "aqueous swellable" if a volume of the material can expand at least about 2.5%, at least about 5%, or at least about 10% in the presence of an aqueous fluid. Some of the aqueous-swellable particles used herein are known to expand in an aqueous fluid about 100% (200% of it original volume). In some embodiments, the aqueous-swellable particle expands to at least about 20% (120% of its original volume) to about 50% (150% of its original volume) when exposed to the aqueous liquid. For example, anhydrous boric oxide in various seawater solution of scale inhibitors or 15% hydrochloric acid expands at least to about 120% of its original volume, and more typically in the range of about 150% to about 210% of its original volume, depending on the aqueous solution. Anhydrous sodium tetraborate in a 10% ammonium salt containing a scale inhibitor/seawater solution expands to about 120% of its original volume.

Some aqueous-swellable materials may be sensitive to pH and other factors. The level of volume expanding of the material may be dependent on the particular aqueous solution used. Some aqueous-swellable materials may expand when exposed to a basic aqueous fluid, and may not expand in an acidic fluid. For example, anhydrous sodium borate can be water-swellable when exposed to basic aqueous fluids, but it may swell slightly, or not at all, in some neutral or acidic solutions.

For expanding the swellable particles in the diverting composition, an additional source of aqueous fluid may be introduced into the subterranean formation after the aqueous-swellable particle is placed in the desired location. Alternatively, the aqueous fluid may be already contained in the subterranean formation at the time the diverting composition is introduced into the stimulation network. For instance, when the carrier fluid is an aqueous fluid, additional aqueous fluid may or may not need to be introduced into the subterranean formation to swell the particles. The aqueous fluid used to expand the aqueous-swellable particles may be fresh water, salt water (e.g., water containing one or more salts dissolved therein), brine (e.g., saturated salt water), seawater, formation water, or various other aqueous treatment fluids introduced into the subterranean formation during various treatments.

As the diverting composition travels down into the stimulation network in the subterranean formation, the diverting composition may gradually mix with the aqueous fluid contained in the subterranean formation, and eventually, the swellable particle may be exposed to sufficient aqueous fluid to swell and fill the fractures (or wormholes).

In some embodiments of the invention, the aqueous-swellable particle bridges or fills the stimulation network temporarily and can be removed by exposing the diverting composition to a sufficient amount of aqueous liquid to at least partially dissolve and degrade the expanded diverting composition. The solubility of a substance is the maximum amount of a material that can be dissolved in given quantity of a given solvent at a given temperature. A material is considered soluble or dissolvable even if it takes a substantial amount of time to reach saturation. Hence aqueous soluble or aqueous dissolvable particles may also refer to materials that are eventually soluble or dissolvable after the stimulation network have been sealed and after the need for diversion has passed so that the expanded diverting composition that have sealed the stimulation network can be removed without cleaning-up or mechanical removal procedures.

Some of the aqueous-swellable particles, such as anhydrous boric oxide, are only slightly soluble in water. However, with time and heat inside the subterranean formation, these partially dehydrated or anhydrous borate materials are hydrated by the exposed surrounding aqueous fluid. The resulting hydrated borate materials are highly soluble in water as compared to the partially or anhydrous borate materials and as a result are dissolved in the aqueous fluid. The total time required for the aqueous-swellable particles to degrade and dissolve in an aqueous fluid may be in the range of from about 8 hours to about 72 hours, depending upon the amount of aqueous fluid the diverting composition are exposed to, the properties of carrier fluid used to place the diverting composition, and the temperature inside the subterranean formation in which the diverting compositions are placed. The hydration time and mechanism of the partially dehydrated or anhydrous borate materials, as well as the relevant parameters have been described in, e.g., U.S. Pat. No. 6,896,058 and U.S. Patent Application Publication No. 2007/0277979, which are incorporated herein by reference in their entirety.

Accordingly, the aqueous-swellable particles may be used to temporarily seal the stimulation network to divert treatments. After a need of diversion has passed, the expanded particle will at least partially dissolve in aqueous solution and degrade away. The diverting composition should not degrade too quickly so that the fractures or wormholes are sufficiently sealed and the anticipated treatment can be diverted to the untreated portion of the subterranean formation. The diverting composition should also not degrade too slowly as subsequent treatments or operations may need to access the whole stimulation network for a uniform treatment or an effective operation. One skilled in the art will be able to choose a proper diverting composition to achieve the desired duration time to at least partially degrade the diverting composition, in view of the anticipated duration time of the diversion treatment, the treatment fluids used, and the degradation time determined as described above.

In some embodiments, depending on the temperature and the type of aqueous fluid used, the same aqueous liquid that initially expands the diverting composition, after contacting with the diverting composition for a sufficient time, may be present in an amount sufficient to eventually hydrate the aqueous-swellable particles and at least partially dissolve the expanded diverting composition.

In other embodiments, the aqueous liquid used to hydrate the aqueous-swellable particles and to dissolve the expanded diverting composition is different from the aqueous fluid initially expands the diverting composition. For example, after the need of diversion has passed, an additional source of aqueous liquid may be introduced into subterranean formation to hydrate or speed and/or complete the hydration and dissolution of the aqueous-swellable particles in the diverting composition.

An aqueous treatment fluid may be used to swells and/or dissolve the aqueous-swellable particle. As used herein, the term "treatment fluid" generally refers to any fluid that may be used in a subterranean application in conjunction with a desired function and/or for a desired purpose. The term "treatment fluid" does not imply any particular action by the fluid or any component thereof. Exemplary treatment fluids include, but are not limited to, aqueous acid solution, aqueous scale inhibiting material solution, aqueous water blocking material solution, aqueous corrosion inhibiting material solution, aqueous clay stabilizer solution, aqueous shale stabilizer solution, aqueous friction reducer solution, aqueous chelating agent solution, aqueous surfactant solution, aqueous paraffin removal solution, aqueous biocide solution, aqueous non-emulsifier solution, and combinations thereof. For example, the aqueous acid solution can include one or more acids such as hydrochloric acid, hydrofluoric acid, acetic acid, formic acid and other organic acids, and combinations thereof. The aqueous scale inhibitor material solution can contain one or more scale inhibitor materials including, but not limited to, tetrasodium ethyleneamine acetate, pentamethylene phosphonate, hexamethylenediamine phosphonate, polyacrylate and combinations thereof.

In addition, after the need for diversion has passed, additional treatment fluids, same or different from the previous aqueous treatment fluid, may be flowed into subterranean formation for further treatments or operations. Any treatments or operations can be used after the subterranean formation has been treated with the diverting composition, including but not limited to stimulation, completion, fracturing, acidizing, workover, and combinations thereof.

In some embodiments, the diverting composition is used in accordance with fracture treatments, such as a hydraulic fracture treatment, in any type of subterranean formations such as a formation of shale, clay, sandstone, limestone, granite, andesite, marble, schist, quartzite, coal bed, carbonate formation, or any other geothermal formation, or combinations thereof. A hydraulic fracturing treatment generally involves creating or enhancing one or more cracks, or "fractures," in the subterranean formation. "Enhancing" one or more fractures or fracture networks in a subterranean formation may include the extension or enlargement of one or more natural or previously created fractures in the subterranean formation. To create new fractures and to extend the fracture network, it may be desirable to seal existing fractures so that treatment fluids can be diverted to the untreated portion of the subterranean formation, e.g., to expand the volume of the fracture network (or wormhole network) and to expand the volume of the subterranean formation being treated without damaging existing fractures. With the diverting composition placed in the desired locations, the existing fractures or fracture networks are protected and successive fracturing treatments can be performed to extend the fracture network.

In some embodiments, the diverting composition is used in accordance with acidizing treatments in subterranean formations, such as carbonate reservoir where the formation comprises acid-soluble components. Stimulation in these formations may typically involve contacting the formation with a treatment fluid that comprises an acid, dissolving the acid-soluble components in a formation, such as calcium carbonate, leaving a desirable amount of voids (e.g., etched fractures, or wormholes) within the formation. Similarly as the hydraulic fracture treatment, the acidizing treatment in the carbonate formations may enhance the formation's permeability and/or increase the rate at which hydrocarbons subsequently may be produced from the formation. It may also be desirable to seal existing wormholes to extend the wormhole network in these formations without damaging existing wormhole network. With the diverting composition placed in the desired locations, the existing wormholes are protected and successive acidizing treatments can be performed to extend the network.

The diverting compositions provide the benefit of treating portions of the subterranean formation that are substantially distanced from the wellbore, perforation tunnels, or formation faces. By using the diverting compositions, treatment fluids can be uniformly distributed in the portion of the subterranean formation surrounding the stimulation network that is being treated, without damaging existing fractures or wormholes. Thus stimulation networks are extended to subterranean zones that are substantially distanced from the wellbore. The volume of the subterranean formation being treated is hence significantly increased and the overall permeability of the subterranean formations is improved.

EXAMPLES

Example 1

A Diverting Composition

About 100 lbs/Mgal of boric oxide in propylene glycol was prepared as a diverter composition. Boric oxide expanded to about 200% of its original volume when being contacted with water. As the material hydrated, its solubility increased. At 250° F., the boric oxide dissolved completely in solution in several days.

Example 2

Expansion Experiment of a Diverting Composition

A non-aqueous liquid was used to carry boric oxide particles and transport them to a tubing in a uniform layer filling 60% to 65% of the tubing volume. After the boric oxide was placed sufficiently within the tubing, a steady stream of tap water was poured into the funnel and through the non-aqueous liquid, displacing it and contacting the boric oxide. A dial indicator was used to monitor the expansion due to the boric oxide swelling.

The boric oxide was measured using a graduated cylinder to a volume of 30 mls. This is sufficient to fill the 8.5 inch flat area of the Tygon® tubing to approximately 65% of total height. Three different carrier fluids were used to place the particles in the tube: ethylene glycol, propylene glycol, and isopropanol. When the boric acid contacted the water without the use of a non-aqueous fluid, the reaction occurred rapidly, within a few seconds, swelling and producing significant heat; in excess of 200° F. Using the glycols as carrier fluids delayed the reaction of boric acid with water when water was introduced. For instance, when the glycols were used to place the particles, a delay of 30 minutes was recorded before any signs of particle swelling or produced heat were noted. Isopropanol was then used in attempt to shorten this delay time. While it may be easier for water to displace isopropanol, the delay of 30 minutes was still observed.

To further analyze this delay of reaction time between boric acid and water, a dry boric oxide particle layer was placed into the tubing and water was added to start the reaction. The reaction was nearly instantaneous, swelling occurred, and heat was produced. An expansion of tubing was recorded with an increase of 0.1 inch. This expansion is in addition of the 35% void left in the tubing before adding the water.

Example 3

Expansion of Particles in Water

In this example, the swelling rates of boric oxide particles as a function of particle size were tested in water.

Boric oxide materials were sieved into particles with sizes within different ranges, as shown in Table 1. The swelling experiments were performed for particles at each size range respectively. For each experiment, particles were separated by particular size range, in this case particles at 8 mesh, 10-12 mesh, 12-14 mesh, 16-18 mesh, 20-30 mesh, 30-40 mesh, and 40 mesh and smaller, and were loaded into a 5 ml graduated cylinder to fill in about 1 ml of the bottom of the cylinder. A long needle was inserted in the pack of particles touching the bottom of the cylinder for fluid injection. At time=0, enough water was injected into the pack of particles to completely cover the particles. The height/volume of the particle pack was then monitored with time and recorded in Table 1.

As shown in Table 1, the swelling of particles generally resulted in an approximate doubling of the original volume of particles (i.e. 100% expansion or increase in the volume of particles). The trend of particles volume eventually reaching 200% of the original volume can be clearly seen in Table 1 with most of the experiments eventually expanded to 2 mL or close to 2 mL (the randomness of testing accounted for some of the differences). The table also illustrates that the rate of swelling differs according to particle size. Smaller particles such as those with sizes about 40 mesh or smaller and those with sizes about 30/40 mesh finished swelling within about one to two minutes; however, larger particles, for instance, those with sizes greater than 8 mesh were still swelling at the end of one hour.

TABLE 1

Swelling of particles in water

| | Volume of particles at different particle sizes (mL) | | | | | | |
|---|---|---|---|---|---|---|---|
| Time (min) | >8$^a$ | 10/12$^a$ | 12/14$^a$ | 16/18$^a$ | 20/30$^a$ | 30/40$^a$ | 40$^a$ or smaller |
| 0 | 1.1 | 1 | 1 | 1.1 | 1.1 | 1.1 | 1.1 |
| 0.37 | 1.1 | 1.2 | 1.2 | 1.3 | 1.3 | 1.3 | 1.7 |
| 0.6 | 1.1 | 1.2 | 1.2 | 1.3 | 1.3 | 1.3 | 1.8 |
| 0.73 | 1.1 | 1.2 | 1.2 | 1.3 | 1.3 | 1.3 | 1.8 |
| 1 | 1.15 | 1.25 | 1.25 | 1.35 | 1.35 | 1.4 | 1.85 |
| 1.5 | 1.15 | 1.3 | 1.3 | 1.4 | 1.4 | 1.65 | 1.85 |
| 2 | 1.15 | 1.3 | 1.3 | 1.4 | 1.45 | 1.7 | 1.85 |
| 2.5 | 1.15 | 1.3 | 1.3 | 1.4 | 1.45 | 1.7 | 1.85 |
| 3 | 1.2 | 1.3 | 1.3 | 1.4 | 1.5 | 1.7 | 1.85 |
| 4 | 1.2 | 1.3 | 1.3 | 1.45 | 1.6 | 1.7 | 1.85 |
| 5 | 1.2 | 1.35 | 1.3 | 1.5 | 1.6 | 1.7 | 1.85 |
| 6 | 1.2 | 1.4 | 1.35 | 1.55 | 1.7 | 1.7 | 1.85 |
| 7 | 1.25 | 1.4 | 1.4 | 1.6 | 1.75 | 1.7 | 1.85 |
| 8 | 1.25 | 1.4 | 1.4 | 1.6 | 1.75 | 1.7 | 1.85 |
| 9 | 1.25 | 1.45 | 1.4 | 1.7 | 1.75 | 1.7 | 1.85 |
| 10 | 1.3 | 1.4 | 1.4 | 1.7 | 1.8 | 1.7 | 1.85 |
| 15 | 1.3 | 1.6 | 1.5 | 1.8 | 1.95 | 1.7 | 1.85 |
| 20 | 1.35 | 1.7 | 1.65 | 1.9 | 2 | 1.7 | 1.85 |
| 25 | 1.35 | 1.75 | 1.7 | 1.95 | 2 | 1.7 | 1.85 |
| 30 | 1.4 | 1.8 | 1.75 | 1.95 | 2.05 | 1.7 | 1.85 |
| 60 | 1.6 | 1.9 | 1.85 | 2 | 2.05 | 1.7 | 1.85 |

$^a$U.S. sieve size

We claim:

1. A method for treating a subterranean formation penetrated by a wellbore, comprising the steps of:
    introducing a diverting composition into one or more fractures in a subterranean formation penetrated by a wellbore, wherein the diverting composition comprises a carrier fluid and a partially dehydrated or anhydrous borate source material that does not swell substantially when placed in contact with the carrier fluid, wherein the carrier fluid is a water-miscible non-aqueous fluid selected from the group consisting of ethylene glycol, propylene glycol, N,N-dimethylformamide, tetrahydrofuran, dichloromethane, 1,4-dioxane, dimethylsulfoxide, tetramethylenesulfone, acetonitrile, hexamethylphosphoramide, 1,3-methyl-3,4,5,6-tetrahydro-2 (1H)-pyrimidinone, propylene carbonate, ethylene carbonate, and combinations thereof; and
    exposing the diverting composition to a sufficient amount of aqueous fluid, whereby the aqueous fluid (a) swells the borate source material to a point where it bridges the one or more fractures, and then (b), after the one or more fractures have been bridged, dissolves at least a portion of the diverting composition.

2. The method of claim 1, wherein the carrier fluid carries and places the borate source material into one or more fractures into the subterranean formation at least 10 feet from the wellbore.

3. The method of claim 1, wherein the subterranean formation is selected from the group consisting of a shale formation, a clay formation, a coal formation, a carbonate formation, a sandstone formation, a limestone formation, a granite formation, a marble formation, and combinations thereof.

4. The method of claim 1, wherein the borate source material does not swell when placed in contact with the non-aqueous fluid.

5. The method of claim 1, wherein the borate source material is selected from the group consisting of anhydrous boric oxide, anhydrous sodium borate, sodium perborate monohydrate, and combinations thereof.

6. The method of claim 1, wherein the concentration of the borate source material in the diverting composition ranges from about 0.0456% v/v to about 15.4% v/v.

7. The method of claim 1, wherein the dissolving feature of the aqueous fluid occurs within about 8 hours to about 72 hours.

8. A method for treating a subterranean formation penetrated by a wellbore, comprising the steps of:
    introducing a diverting composition into one or more wormholes in a subterranean formation penetrated by a wellbore, wherein the diverting composition comprises a carrier fluid and a partially dehydrated or anhydrous borate source material that does not substantially swell when placed in contact with the carrier fluid, wherein the carrier fluid is a water-miscible non-aqueous fluid selected from the group consisting of ethylene glycol, propylene glycol, N,N-dimethylformamide, tetrahydrofuran, dichloromethane, 1,4-dioxane, dimethylsulfoxide, tetramethylenesulfone, acetonitrile, hexamethylphosphoramide, 1,3-methyl-3,4,5,6-tetrahydro-2 (1H)-pyrimidinone, propylene carbonate, ethylene carbonate, and combinations thereof; and
    exposing the diverting composition to a sufficient amount of aqueous fluid, whereby the aqueous fluid (a) swells the borate source material to a point where it bridges the one or more wormholes, and then (b), after the one or more wormholes have been bridged, dissolves at least a portion of the diverting composition.

9. The method of claim 8, wherein the non-aqueous carrier fluid carries and places the borate source material into one or more wormholes into the subterranean formation at least 10 feet from the wellbore.

10. The method of claim 8, wherein the subterranean formation is a carbonate formation.

11. The method of claim 8, wherein the borate source material does not swell when placed in contact with the non-aqueous fluid.

12. The method of claim 8, wherein the borate source material is selected from the group consisting of anhydrous boric oxide, anhydrous sodium borate, sodium perborate monohydrate, and combinations thereof.

13. The method of claim 8, wherein the concentration of the borate source material in the diverting composition ranges from about 0.0456% v/v to about 15.4% v/v.

14. The method of claim 8, wherein the dissolving feature of the aqueous fluid occurs within about 8 hours to about 72 hours.

15. A method for treating a subterranean formation penetrated by a wellbore, comprising the steps of:
   providing a water-miscible, non-aqueous carrier fluid;
      wherein the carrier fluid is a water-miscible non-aqueous fluid selected from the group consisting of ethylene glycol, propylene glycol, N,N-dimethylformamide, tetrahydrofuran, dichloromethane, 1,4-dioxane, dimethylsulfoxide, tetramethylenesulfone, acetonitrile, hexamethylphosphoramide, 1,3-methyl-3,4,5,6-tetrahydro-2(1H)-pyrimidinone, propylene carbonate, ethylene carbonate, and combinations thereof;
   providing a partially dehydrated or anhydrous borate source material that does not swell substantially when placed in contact with the carrier fluid;
   combining the carrier fluid and the partially dehydrated or anhydrous borate source material to create a diverting composition;
   introducing a diverting composition into one or more fractures in a subterranean formation penetrated by a wellbore;
   exposing the partially dehydrated or anhydrous borate source material to a sufficient amount of aqueous fluid, whereby the aqueous fluid swells the borate source material to a point where it bridges the one or more fractures, and then,
   after the one or more fractures have been bridged, exposing the partially dehydrated or anhydrous borate source material to a sufficient amount of aqueous fluid, whereby the aqueous fluid dissolves at least a portion of the partially dehydrated or anhydrous borate source material.

* * * * *